(12) United States Patent
Rosenthal

(10) Patent No.: US 7,044,020 B2
(45) Date of Patent: May 16, 2006

(54) TAPERED GRIP FOR MOTORCYCLE HANDLEBAR

(75) Inventor: Henry Rosenthal, Macclesfield (GB)

(73) Assignee: Renthal Limited, Bredbury (GB)

( * ) Notice: Subject to any disclaimer, the term of this patent is extended or adjusted under 35 U.S.C. 154(b) by 0 days.

(21) Appl. No.: 10/694,021

(22) Filed: Oct. 28, 2003

(65) Prior Publication Data
US 2004/0093979 A1   May 20, 2004

(30) Foreign Application Priority Data
Nov. 14, 2002  (GB) ................................. 0226538.7

(51) Int. Cl.
B62K 21/26   (2006.01)

(52) U.S. Cl. ................... 74/551.9; D8/303; 473/303; 16/421

(58) Field of Classification Search ............... 74/551.8, 74/558, 551.9, 488, 489; D8/303; 16/421; 473/303
See application file for complete search history.

(56) References Cited

U.S. PATENT DOCUMENTS

| | | | | |
|---|---|---|---|---|
| 4,416,166 A | * | 11/1983 | Jannard et al. ............ | 74/551.9 |
| D284,259 S | * | 6/1986 | Oury ............................ | D8/303 |
| 4,941,232 A | * | 7/1990 | Decker et al. ................ | 16/421 |
| 5,011,145 A | * | 4/1991 | Bartkowicz ................. | 473/568 |
| 5,261,665 A | * | 11/1993 | Downey ..................... | 473/303 |
| 5,280,735 A | * | 1/1994 | Kuipers et al. ............. | 74/551.9 |
| 5,584,213 A | * | 12/1996 | Larson et al. .............. | 74/551.9 |
| D405,342 S | * | 2/1999 | Thompson ................... | D8/303 |
| 6,112,618 A | * | 9/2000 | Yates .......................... | 74/551.9 |
| D461,390 S | * | 8/2002 | Livingston ................... | D8/303 |

FOREIGN PATENT DOCUMENTS

EP   0 671 315 A2   9/1995
JP   3-136992   *   6/1991   ............... 74/551.9

* cited by examiner

Primary Examiner—Vinh T. Luong
(74) Attorney, Agent, or Firm—Oliff & Berridge, PLC

(57) ABSTRACT

A motorcycle handlebar hand grip has a hollow cylindrical body with a first, open end and an opposing, second end, which may be open or closed, and an annular flange projecting radially outwards at the first, open end. In order to prolong its useful life as regards wear by a rider's hand, and also improve comfort and vibration damping, the body has an external surface which is formed with projections and which tapers from adjacent the flange to adjacent the second end. The taper is achieved by the projections progressively decreasing in height from adjacent the flange to adjacent the second end. The base area of the respective projections may also progressively decrease in size from adjacent the flange to adjacent the second end.

3 Claims, 3 Drawing Sheets

TAPERED GRIP FOR MOTORCYCLE HANDLEBAR

TECHNICAL FIELD

This invention concerns a hand grip adapted for fitting onto a motorcycle handlebar end section.

BACKGROUND ART

Such a grip conventionally comprises a hollow cylindrical body of flexible resilient material, such as rubber (natural or synthetic), having a first, open end, an opposing second end, which may be open or closed by an end wall, and an annular flange projecting radially outwards at the first open end. Respective grips are fitted snugly and non-rotatably onto each end of a handlebar. When the second end is closed, the end wall abuts the end of the bar. The flange provides an inner limit for a rider's hand where his/her forefinger and thumb encircle the grip in use.

In order to provide greater comfort to the rider and enhanced vibration damping it is known to form such grips from two compounds, i.e. two differing formulations of rubber, so that the flange, an inner layer of the cylindrical body, and the end wall when present, are formed from a firmer, less flexible compound, while an outer layer of the cylindrical body is formed from a softer, more flexible compound.

It is also known to provide the outer layer of such a grip with projections distributed in a pattern over its external surface. Indeed, provision of such a pattern of projections, which only project from the surface by something less than 1 mm in most cases, is well known generally for all types of handlebar grips to reduce potential for slippage by the rider's hands.

It has been observed that motorcycle hand grips tend to wear more quickly in the region below the arch of the thumb and forefinger of the rider.

OBJECTS OF INVENTION

An object of the invention is to provide for excess wear in this region so that the hand grip, as a whole, might last longer before splitting or needing replacement.

A further object is to provide enhanced comfort and vibration damping to the hands of the rider.

SUMMARY OF INVENTION

This object is achieved in a hand grip having the features specified above in that the projections formed on the cylindrical body progressively decrease in height from adjacent the flange to adjacent the opposing, second end (closed or open), so as to provide an external taper to the body.

The external diameter of a hand grip in accordance with the invention may reduce by less than 5 mm from adjacent the flange to adjacent the second end. Nevertheless, the effect in terms of prolonged life of the grip and comfort to the rider is significant.

The overall size of such projections, particularly their base areas, may conveniently decrease from adjacent the flange to adjacent the second end.

In embodiments where the cylindrical body is formed from an inner layer and an outer layer of different formulations of flexible, resilient material, in which respect the outer layer is of greater flexibility than the inner layer, the inner layer is preferably of substantially constant external diameter, while the outer layer tapers in its external diameter. The outer layer taper is then provided by projections of decreasing height or overall size, as aforesaid, on its external surface.

BRIEF DESCRIPTION OF DRAWINGS

The invention will be described further, by way of example, with reference to the drawings, in which.

DETAILED DESCRIPTION OF EMBODIMENTS

Figure 1:
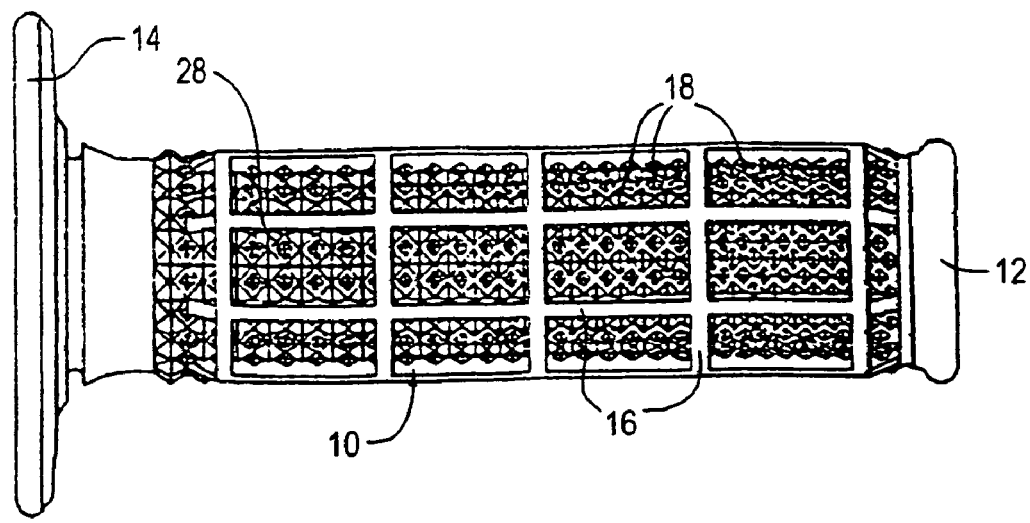
FIG. 1 is a side elevation of a preferred practical embodiment of the hand grip of the invention.
Figure 2:
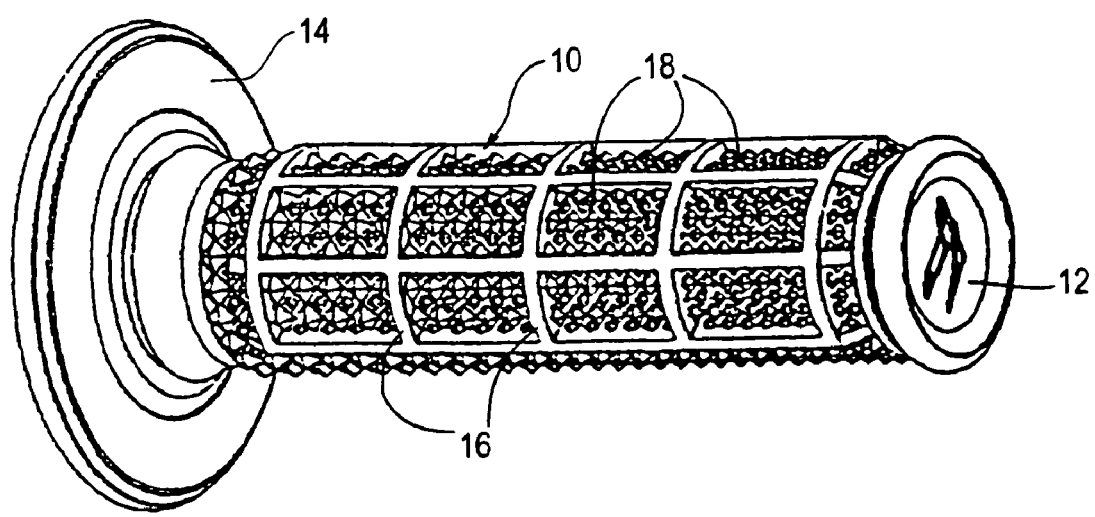
FIG. 2 is a perspective view of the same hand grip.
Figure 3:
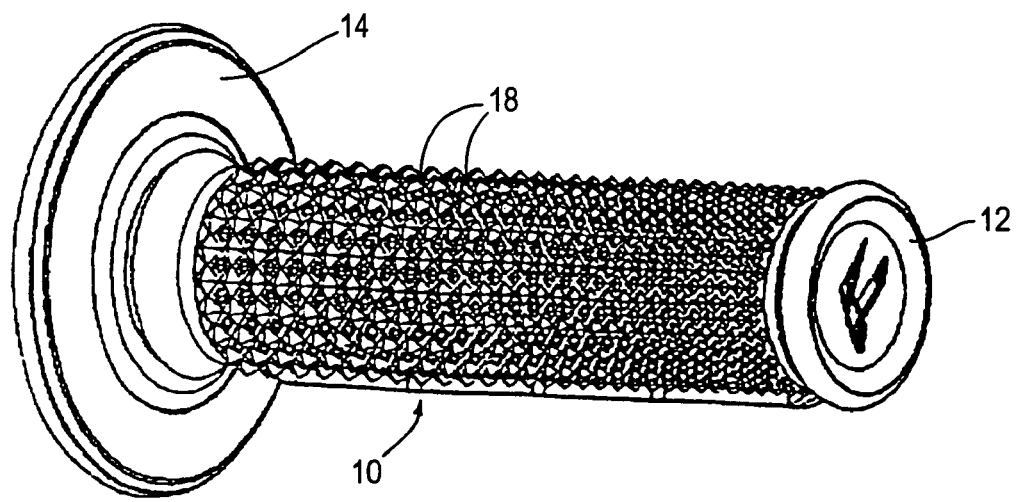
FIG. 3 is also a perspective view, but with the hand grip rotated compared to FIG. 2 so as to show the other side.

The hand grip illustrated in FIGS. 1 to 3 has a hollow cylindrical body 10, an open end from which an annular flange 14 projects radially outwards, and an opposing end closed by an end wall 12.

The hand grip is formed from two different grades of rubber. A firmer less flexible grade is used to form a base or inner layer of the body 10, as well as the end wall 12 and the flange 14. A softer, more flexible grade is used to form an outer layer to the body 10, including a raised pattern of adjoining rectangles 16 on one side of the body 10 and a pattern of surface projections 18 which are also present inside the boundary of the aforesaid rectangular pattern 16.

The projections 18 in this embodiment are generally in the form of a plurality of adjacent square pyramids, each having a diamond shaped base 28, i.e. its diagonal being axial relative to the cylindrical body 10 of the grip. The overall size of the respective pyramidal projections 18 decreases gradually from adjacent the flange 14 to adjacent the closed end. Thus the diamond shaped bases 28 decrease in area and the height of the projections also decreases. This provides an overall taper to the external diameter of the body 10.

Such taper need not be great to serve its purpose. It may be an overall reduction in external diameter of only 2 mm from adjacent the flange 14 to adjacent the closed end. It is unlikely to be more than a 5 mm reduction in external diameter.

By making the region adjacent the flange 14 somewhat thicker, particularly making this extra thickness from the softer rubber compound, extra cushioning of the rider's hand is provided in exactly the region of greatest pressure and greatest wear, i.e. below the arch formed by thumb and forefinger. Also, because there is more material, this region does not wear down, split and fail as quickly as hitherto in the case of substantially constant external diameter grips.

The use of a gradual taper achieves these advantages without making the handgrip overall too thick for effective gripping/encircling by the rider's hand, as the region towards the closed end 12 is still of virtually the same external diameter as on conventional grips.

Figure 4:
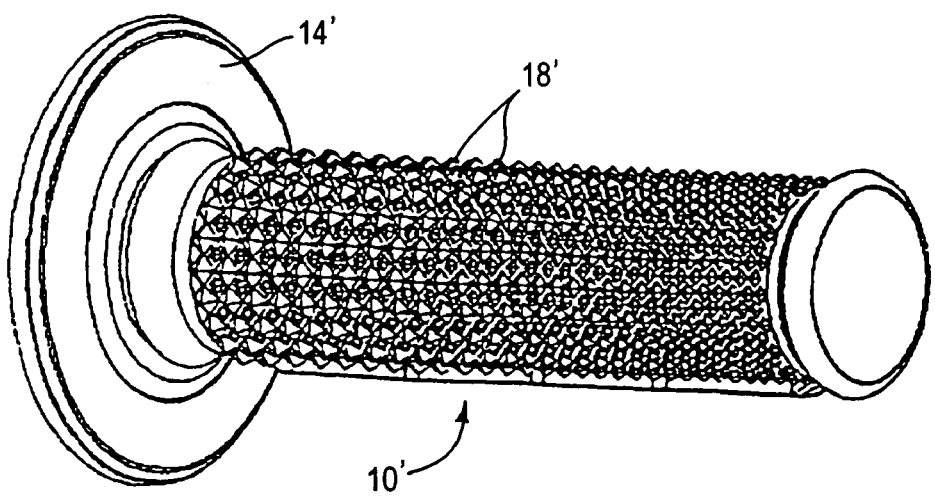
FIG. 4 is a perspective view, corresponding to FIG. 3, of a second practical embodiment of the hand grip of the invention.
Figure 5:
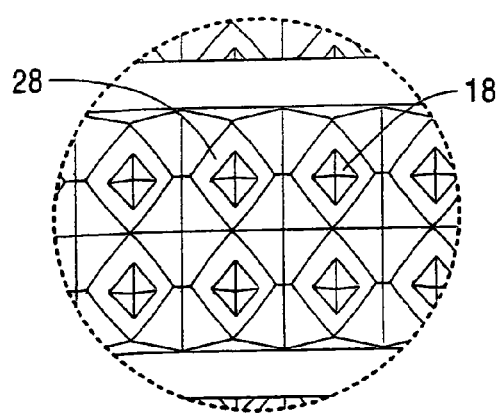
FIGS. 5 and 6 are enlarged views of sections of the grip shown in FIG. 1.
Figure 6:
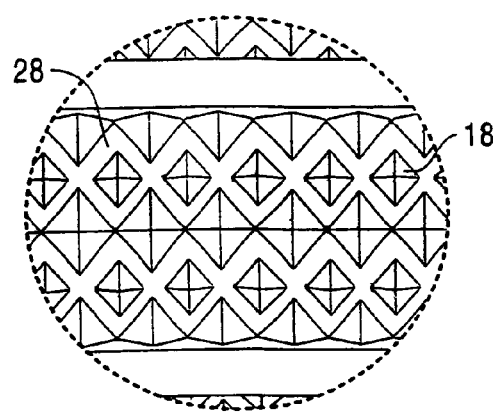

The hand grip illustrated in FIG. 4 differs from that in FIGS. 1 to 3 only in that its second end, opposing the open end where the flange 14$^1$ projects, is also open. In all other respects relating to the inventive feature of the tapered body it is the same and identical reference numerals with the addition of $^1$ are used to designate the parts exactly corresponding to those in the above described embodiment. Such an open-ended hand grip is often used for motorcycles designed for motocross, whereas a closed end grip is used for trials bikes.

In other embodiments of the invention, which are not illustrated, the taper can be achieved without use of two compounds. Also, the external projections may be of a different shape and size to the illustrated embodiment.

The invention claimed is:

1. A hand grip adapted for non-rotatable fitting onto a motorcycle handlebar end section, the hand grip comprising:
   a hollow cylindrical body having a first, open end;
   an opposing, second end; and
   an annular flange projecting radially outwards at the first, open end, the cylindrical body also having an external surface formed with a plurality of projections distributed there over, said projections progressively decreasing in a base area and in height from adjacent the flange to adjacent the second end so as to provide an external taper to the body.

2. A hand grip as set forth in claim 1 wherein the external diameter of the cylindrical body reduces by less than 5 mm from adjacent the flange to adjacent the second end.

3. A hand grip as set forth in claim 1 wherein the second end is closed by an end wall.

\* \* \* \* \*